No. 846,008. PATENTED MAR. 5, 1907.
J. M. CLAUSEN.
LINE HOLDER.
APPLICATION FILED JUNE 16, 1906.
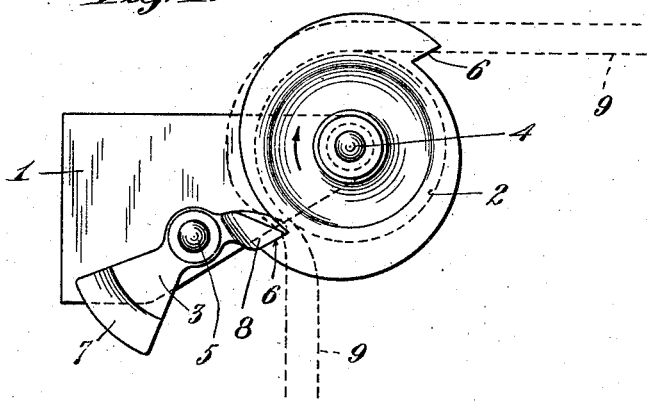
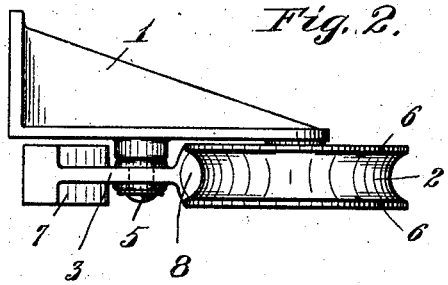
Witnesses.
E. W. Jeppesen,
A. H. Opsahl.
Inventor:
Jens M. Clausen.
By his Attorneys
Williamson & Merchant

UNITED STATES PATENT OFFICE.

JENS M. CLAUSEN, OF HOPKINS, MINNESOTA, ASSIGNOR, BY DIRECT AND MESNE ASSIGNMENTS, OF ONE-FOURTH TO HANS NELSON, ONE-EIGHTH TO ELMER F. CODDINGTON, AND ONE-EIGHTH TO WILLIAM L. FEUDNER, ALL OF HOPKINS, MINNESOTA.

LINE-HOLDER.

No. 846,008.  Specification of Letters Patent.  Patented March 5, 1907.

Application filed June 16, 1906. Serial No. 322,111.

*To all whom it may concern:*

Be it known that I, JENS M. CLAUSEN, a citizen of the United States, residing at Hopkins, in the county of Hennepin and State of Minnesota, have invented certain new and useful Improvements in Line-Holders; and I do hereby declare the following to be a full, clear, and exact description of the invention, such as will enable others skilled in the art to which it appertains to make and use the same.

My invention has for its object to provide an improved line-holder especially adapted for use to support and secure the end of a clothes-line.

To the above ends the invention consists of the novel devices and combinations of devices hereinafter described, and defined in the claims.

The improved device is illustrated in the accompanying drawings, wherein like characters indicate like parts throughout the several views.

Referring to the drawings, Figure 1 is a view in side elevation, showing the improved line-holder; and Fig. 2 is a plan view thereof.

The improved device comprises three parts—to wit, a supporting-bracket 1, a sheave or wheel 2, and a dog or pawl 3. The sheave 2 is journaled to the bearing-bracket 1, as shown, by means of a stud 4, and the lock-dog 3, as shown, has pivotal connection to the bracket 1 by a stud 5. The said sheave 2 has eccentric side flanges that terminate in abrupt lock-shoulders 6, each of the side flanges, as shown, having two such lock-shoulders located at diametrically opposite points. The rear or lower end of the dog 3 is enlarged to form a weight 7, and the outer or upper end of said dog is formed with a crotch or fork 8, the intermediate portion of which is adapted to directly engage and pinch upon the rope or line, which latter is indicated by dotted lines in Fig. 1 and is marked by the numeral 9. The prongs of the fork 8 are adapted to be engaged by the shoulders 6 of the eccentric flanges of the sheave 8, and their points lie in the same plane as the coöperating eccentric flanges.

The action of the improved device is substantially as follows: The rope or line is passed over the sheave 2 and is drawn forward between the said sheave and fork 8 of the lock-dog 3. To take up the slack of the rope or line 9, it is only necessary to draw downward on the depending end thereof, under which movement the sheave 2 will be rotated, and the eccentric flanges thereof acting on the prongs of the dog 3 will positively force the said dog away from the said rope or cord. When the depending end of the rope or line is released, the sheave will be rotated in a reverse direction—to wit, in the direction of the arrow marked thereon in Fig. 1—and the forked end of the dog will then be allowed to engage the said rope or line under the action of gravity until the one transversely-opposite pair of the shoulders 6 are engaged with the prongs of the said dog, whereupon the entire tension of the line will be rendered effective to cause the said dog to press the said line or rope against the sheave. The said dog then of course serves to lock the sheave against further rotation in the direction indicated by said arrow. The arrangement is of course such that the pronged end of the dog 3 cannot be forced to a dead-center with respect to the axes of the studs 4 and 5.

In actual practice this device has been found to be extremely efficient for the purposes had in view. The device is, as is obvious, very simple and is of small cost. The eccentric flanges of the sheave may, of course, be provided with any desired number of so-called "lock-shoulders" 6.

What I claim is—

1. The combination with a bracket 1, of a sheave 2 journaled to said bracket and provided with an eccentric flange terminating in a lock-shoulder 6, and a lock-dog 3 pivoted to said bracket and having a line-engaging end arranged to press the line against said sheave and to be engaged and released by the eccentric flange of said sheave, and to be engaged and pressed against the line by said shoulder 6, substantially as described.

2. The combination with a bracket 1, of a sheave 2 journaled to said bracket and provided with eccentric flanges terminating in lock-shoulders 6, and a gravity-actuated dog 3 pivoted to said bracket and having a forked end, and arranged to press the rope against said sheave and to be engaged and released by the eccentric flanges of said sheave, and to be engaged or pressed against the rope or line by said shoulders 6, substantially as described.

In testimony whereof I affix my signature in presence of two witnesses.

JENS M. CLAUSEN.

Witnesses:
O. N. HOEL,
HANS NELSON.